United States Patent
Yaegashi et al.

(10) Patent No.: US 10,072,108 B2
(45) Date of Patent: Sep. 11, 2018

(54) FORMED ARTICLE

(71) Applicant: Daicel Corporation, Osaka-shi, Osaka (JP)

(72) Inventors: Takayuki Yaegashi, Fuji (JP); Keiichi Osano, Fuji (JP); Yoshimichi Okano, Himeji (JP); Kouichi Umemoto, Himeji (JP); Takeshi Yagi, Tokyo (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 15/312,983

(22) PCT Filed: Apr. 20, 2015

(86) PCT No.: PCT/JP2015/061988
§ 371 (c)(1),
(2) Date: Nov. 21, 2016

(87) PCT Pub. No.: WO2015/178145
PCT Pub. Date: Nov. 26, 2015

(65) Prior Publication Data
US 2017/0190815 A1    Jul. 6, 2017

(30) Foreign Application Priority Data

May 23, 2014  (JP) ................. 2014-107146

(51) Int. Cl.
| | | |
|---|---|---|
| *C08F 210/00* | (2006.01) | |
| *C08F 232/00* | (2006.01) | |
| *C08F 232/04* | (2006.01) | |
| *C08J 5/18* | (2006.01) | |
| *C08F 210/04* | (2006.01) | |
| *C08F 210/14* | (2006.01) | |

(52) U.S. Cl.
CPC .......... *C08F 210/00* (2013.01); *C08F 210/04* (2013.01); *C08F 210/14* (2013.01); *C08F 232/00* (2013.01); *C08J 5/18* (2013.01)

(58) Field of Classification Search
CPC .... C08F 210/04; C08F 210/14; C08F 232/00; C08F 232/14; C08F 2500/25
USPC ....................................... 526/281
See application file for complete search history.

(56) References Cited

U.S. PATENT DOCUMENTS

| | | | | |
|---|---|---|---|---|
| 6,310,160 B1* | 10/2001 | Kodemura | ............. | C08F 32/08 524/553 |
| 2009/0018296 A1 | 1/2009 | Ikeda et al. | | |
| 2009/0082536 A1 | 3/2009 | Nagura et al. | | |
| 2009/0292088 A1 | 11/2009 | Oshima et al. | | |

FOREIGN PATENT DOCUMENTS

| | | |
|---|---|---|
| JP | 2000-119328 A | 4/2000 |
| JP | 2007-161812 A | 6/2007 |
| JP | 2009-298999 A | 12/2009 |
| JP | 2010-254910 A | 11/2010 |
| JP | 5017222 B2 | 9/2012 |
| KR | 10-2008-0000568 A | 1/2008 |

OTHER PUBLICATIONS

Jung, H.Y., et al., Norbornene Copolymerization With α-olefins Using Methylene-Bridged ansa-Zirconocene, Polyhedron 24:1269-1273, 2005.
Office Action issued to KR Patent Application No. 10-2016-7032167, dated Jul. 18, 2017.
Cai, Z., et al., Highly Active Living Random Copolymerization of Norbornene and 1-Alkene with ansa-Fluorenylamidodimethyltitanium Derivative: Substituent Effects on Fluorenyl Ligand, Macromolecules, American Chemical Society 43(10):4527-4531, May 25, 2010.
Cai, Z.-G., et al., Precise Synthesis of Olefin Block Copolymers Using a Syndiospecific Living Polymerization System, Chinese Journal of Polymer Science 31(4):541-549, Mar. 9, 2013.
Extended European Search Report issued in European Patent Application No. 15795746.5 dated Jan. 18, 2018.
Takeshi, S., et al., Random Copolymerization of Norbornene with Higher 1-Alkene with ansa-Fluorenylamidodimethyltitanium Catalyst, Macromolecules 41(22):8292-8294, Nov. 25, 2008.
Yuepeng, X., et al., Nickel(II) Complexes Bearing the bis(β-Ketoamino) Ligand for the Copolymerization of Norbornene with a Higher 1-Alkene, Journal of Applied Polymer Science 124(2):1323-1332, Apr. 15, 2012.

* cited by examiner

*Primary Examiner* — Fred M Teskin
(74) *Attorney, Agent, or Firm* — Knobbe, Martens, Olson & Bear, LLP

(57) ABSTRACT

Provided is a film, sheet, plate, or other such formed article having excellent transparency made of a copolymer obtained from a cyclic olefin monomer and an α-olefin monomer. The present invention provides a formed article made from a copolymer having Tg of 170° C. or higher and an Al content of 50 ppm or less that is a copolymer including a structural unit of a cyclic olefin monomer (A) derived from norbornene and a structural unit of a monomer (B) derived from at least one C4-C12 α-olefin.

5 Claims, No Drawings

FORMED ARTICLE

FIELD OF THE INVENTION

The present invention relates to a formed article.

BACKGROUND OF THE INVENTION

Cyclic olefin polymers and cyclic olefin copolymers (also referred to as "COP" or the like and "COC" or the like, respectively), which have low hygroscopicity and high transparency, are used for various applications including those in the field of optical materials, such as optical disk substrates, optical films, and optical fibers. Representative examples of COC include a copolymer of cyclic olefin and ethylene. The glass transition temperature of such a copolymer can be altered by varying a copolymer composition of cyclic olefin and ethylene. This enables manufacture of a copolymer having a glass transition temperature (Tg) higher than that of COP. Even a Tg of more than 200° C., which is difficult to be obtained for COP, can be achieved. However, disadvantageously, COC is hard and brittle, and has low mechanical strength, poor handling properties, and insufficient processability.

Various high-Tg polymers are currently available. However, they have polar groups, and thus show limited hygroscopic and dielectric properties. Accordingly, there have been demands for a high-Tg polymer having an olefin based backbone but not having a polar group and showing excellent optical properties, dielectric characteristics, and mechanical strength.

One of the approaches for improving the mechanical strength of a high-Tg COC involves copolymerizing a cyclic olefin with an α-olefin other than ethylene (hereinafter, referred to as a "specific α-olefin"). Various studies have been conducted about copolymerization of a cyclic olefin and a specific α-olefin.

Copolymerization of a cyclic olefin and a specific α-olefin significantly differs from that of a cyclic olefin and ethylene. When a cyclic olefin is copolymerized with a specific α-olefin, a chain transfer reaction due to the specific α-olefin may occur under the conditions where a high molecular weight product can be obtained by copolymerizing a cyclic olefin with ethylene. Because of this, a high molecular weight product has been difficult to be obtained. Therefore, a copolymer of a cyclic olefin and a specific α-olefin has been considered to be unsuitable for a forming material (see, for example, Nonpatent Document 1).

Patent Document 1 describes that a high molecular weight product formed from a cyclic olefin and a specific α-olefin was obtained in the presence of a specific Ti-based catalyst, and that a film with excellent physical properties was obtained having a Tg of 245 to 262° C., a low hygroscopicity, and a linear expansion coefficient of less than 80 ppm. However, large amounts of a catalyst and a co-catalyst are used for the polymerization method disclosed in Patent Document 1. This may leave the following problems: the saving of resources is difficult; the production cost of a copolymer is high; and the transparency of a film is impaired by a residual catalyst and co-catalyst. Note that 92 to 164 g of a copolymer can be obtained per gram of a catalyst in Patent Document 1.

Patent Document 2 discloses a film having an excellent punching property, but its Tg is less than 170° C. Further, large amounts of a catalyst and a co-catalyst are used in Patent Document 2, resulting in the following problems: the saving of resources is difficult; the production cost of a copolymer is high; and the transparency and thermal stability of a film is impaired. Note that 127 to 275 g of a copolymer can be obtained per gram of a catalyst in Patent Document 2.

Patent Document 1: Japanese Unexamined Patent Application, Publication No. 2009-298999
Patent Document 2: Japanese Patent No. 5017222
Non-Patent Document 1: Jung, H. Y. et al., *Polyhedron*, 2005, 24, pp. 1269-1273

SUMMARY OF THE INVENTION

Problems to be Solved by the Invention

Because of a catalyst and co-catalyst used in large amounts, the cost is, however, high for the conventional manufacturing methods which have been used to manufacture a copolymer of a cyclic olefin monomer and an α-olefin monomer. In addition, a catalyst and co-catalyst may remain in a copolymer, impairing various properties of a formed article obtained from the copolymer (a film, a sheet, a plate and the like), such as transparency, heat resistance, heat-aging resistance, and dielectric characteristics. Therefore, the development of a copolymer has been required from which a formed article excellent in these properties can be obtained.

The present invention is made in view of the aforementioned circumstances. An object of the present invention is to provide an excellently transparent formed article such as a film, a sheet, and a plate, which is formed of a copolymer obtained from a cyclic olefin monomer and an α-olefin monomer.

Means for Solving the Problems

The present inventors find that a film with particularly excellent transparency can be obtained using a copolymer in which the content of aluminum is less than a certain amount. Then the present invention has been completed. More specifically, the present invention can provide the followings.

(1) A formed article comprising a copolymer, the copolymer comprising a structural unit of a cyclic olefin monomer (A) derived from norbornene, and
a structural unit of a monomer (B) derived from at least one of C4 to C12 α-olefins, and
the copolymer having a Tg of 170° C. or more and an Al content of 50 ppm or less.

(2) The formed article according to (1), wherein the formed article is a transparent film.

(3) The formed article according to (1) or (2), wherein the number average molecular weight of the copolymer is 20,000 or more and 200,000 or less.

(4) The formed article according to any one of (1) to (3), wherein a value of haze as measured in accordance with the JIS K7136 method is 0.1 to 1.0%.

(5) A transparent electrically conductive layered product, comprising the formed article according to any one of (1) to (4) and a transparent electrically conductive layer.

Effects of the Invention

The present invention can provide an excellently transparent formed article, such as a film, a sheet, and a plate, which is formed of a copolymer obtained from a cyclic olefin monomer and an α-olefin monomer.

DETAILED DESCRIPTION OF THE INVENTION

Below, embodiments of the present invention will be described in detail. However, the present invention shall not be limited to the following embodiments.

A formed article according to the present invention includes a copolymer, the copolymer including a structural unit of a cyclic olefin monomer (A) derived from norbornene and a structural unit of a monomer (B) derived from at least one of C4 to C12 α-olefins, the copolymer having a Tg of 170° C. or more and an Al content of 50 ppm or less.

[Copolymer]

The copolymer according to the present invention includes a structural unit from a cyclic olefin monomer (A) derived from norbornene and a structural unit from an α-olefin monomer (B) derived from C4 to C12 α-olefin. Such a copolymer can be obtained by polymerizing at least a cyclic olefin monomer (A) derived from norbornene, and an α-olefin monomer (B) derived from C4 to C12 α-olefin in the presence of a catalyst and the like.

The glass transition temperature (Tg) of the copolymer according to the present invention is 170° C. or more, preferably 200° C. or more, more preferably 230° C. or more, and in particular preferably 260° C. or more. A glass transition temperature of 170° C. or more as described above can confer sufficient heat resistance on a formed article obtained from the above copolymer. Therefore, the formed article can suitably be used, for example, as a substrate for ITO vapor deposition. In particular, a glass transition temperature of 260° C. or more as described above can confer even more sufficient heat resistance on a formed article obtained from the above copolymer. Therefore, the formed article is more resistant to deformation, cracking, melting and the like even when making contact with, for example, a lead-free solder melt, and thus can suitably be used as a member for a lead-free solder. Further, there is no particular limitation for the upper limit of the glass transition temperature of the above copolymer, but it is preferably 350° C. or less, and more preferably 330° C. or less. This is because a high glass transition temperature may decrease the structural unit from α-olefin in the copolymer, and thus tend to reduce the effect of α-olefin copolymerization for improving mechanical strength. Note that the glass transition temperature as used herein refers to a value as measured by the DSC method (the method in accordance with JIS K 7121) under a condition of a heating rate of 20° C./min.

The content of aluminum (hereinafter referred to as "Al") in the copolymer according to the present invention is 50 ppm or less, preferably 30 ppm or less, and more preferably 10 ppm or less. When a copolymer with a relatively high Tg (for example, 170° C. or more) has an Al content of 50 ppm or less, brittleness commonly observed for such a copolymer may be reduced. Therefore, a formed article having excellent strength will be able to be obtained. There is no particular limitation for the lower limit of the Al content in the copolymer, but it is 0 ppm or more, and more preferably 0.5 ppm or more.

There is no particular limitation for the method of achieving an Al content in the copolymer of 50 ppm or less, but it may easily be achieved using a catalyst and a co-catalyst described below during polymerization. When a catalyst and a co-catalyst described below are used during polymerization, the usage amounts of them can be reduced (for example, the amount of a co-catalyst to be used is 0.0001 parts by mass or more and 5.0000 parts by mass or less in terms of Al relative to 100 parts by mass of a cyclic olefin monomer). A catalyst and a co-catalyst used in large amounts may impair the transparency of a formed article obtained from a copolymer. However, according to the present invention where only small amounts of a catalyst and a co-catalyst are used, a highly transparent formed article can be obtained at low cost.

The number average molecular weight of the copolymer according to the present invention is preferably 20,000 or more and 200,000 or less, and more preferably 30,000 or more and 150,000 or less. When the number average molecular weight as described above is 20,000 or more, the resulting copolymer tends not to have an excessively low glass transition temperature (Tg). When the number average molecular weight as described above is 200,000 or less, the resulting copolymer solution tends not to have an excessively high viscosity. Note that the number average molecular weight as used herein refers to that in terms of polystyrene as measured by the gel permeation chromatography.

The copolymer according to the present invention can be obtained by polymerizing a cyclic olefin monomer (A), an α-olefin monomer (B), and others as described below in the presence of any catalyst. For a catalyst to be used, preferred is a titanocene catalyst or a non-bridged ketimide-modified half-titanocene catalyst in view of that the copolymer according to the present invention (that is, a copolymer having values of Tg and an Al content within certain ranges) tends to be obtained. Below, these preferred catalysts will be described.

(Titanocene Catalysts)

There is no particular limitation for the titanocene catalyst, and any known titanocene catalyst may be used. However a half-titanocene catalyst is preferably used. Titanocene catalysts may be used alone or in combination of two or more.

Titanocene catalysts include, for example, those represented by the following formula (1).

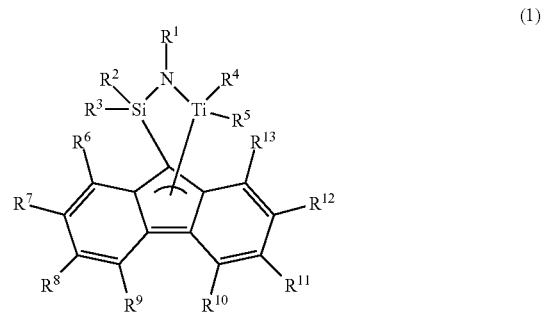

(1)

$R^1$ to $R^3$ are each independently an alkyl group having 1 to 6 carbon atoms or an aryl group having 6 to 12 carbon atoms. Their specific examples can include alkyl groups such as a methyl group, an ethyl group, a propyl group, an isopropyl group, a butyl group, an isobutyl group, a t-butyl group, a pentyl group, a hexyl group, a cyclopentyl group and a cyclohexyl group; aryl groups such as a phenyl group, a biphenyl group, phenyl or biphenyl groups having the above alkyl groups as substituents, a naphthyl group, and naphthyl groups having the above alkyl groups as substituents.

$R^4$ and $R^5$ are each independently an alkyl group having 1 to 12 carbon atoms, an aryl group having 6 to 12 carbon atoms, or a halogen atom. Their specific examples can include halogen atoms such as a fluorine atom, a chlorine atom, a bromine atom, and an iodine atoms; a methyl group, an ethyl group, a propyl group, an isopropyl group, a butyl group, an isobutyl group, a t-butyl group, a pentyl group, a hexyl group, a heptyl group, an octyl group, a cyclopentyl group, a cyclohexyl group, these alkyl groups having the above halogen atoms as substituents; a phenyl group, a biphenyl group, a naphthyl group, these aryl groups having the above halogen atoms or alkyl groups as substituents.

$R^6$ to $R^{13}$ are each independently a hydrogen atom, an alkyl group having 1 to 12 carbon atoms, an aryl group having 6 to 12 carbon atoms, or a silyl group optionally having a monovalent hydrocarbon group with 1 to 12 carbon atoms as a substituent. Specific examples of the alkyl group having 1 to 12 carbon atoms can include a methyl group, an ethyl group, a propyl group, an isopropyl group, a butyl group, an isobutyl group, a t-butyl group, a pentyl group, a hexyl group, a heptyl group, an octyl group, a cyclopentyl group, a cyclohexyl group, and the like. Further, specific examples of the aryl group having 6 to 12 carbon atoms can include a phenyl group, a biphenyl group, a naphthyl group, and these aryl groups having the above alkyl groups as substituents. Further, specific examples of the silyl group having a monovalent hydrocarbon group with 1 to 12 carbon atoms can include a silyl group having an alkyl group with 1 to 12 carbon atoms as a substituent such as a methyl group, an ethyl group, a propyl group, an isopropyl group, a butyl group, an isobutyl group, a t-butyl group, a pentyl group, a hexyl group, a heptyl group, an octyl group, a cyclopentyl group, and a cyclohexyl group.

Specific examples of the titanocene catalyst represented by the general formula (1) can include (isopropylamide)dimethyl-9-fluorenyl silane titanium dimethyl, (isobutylamide)dimethyl-9-fluorenyl silane titanium dimethyl, (t-butylamide)dimethyl-9-fluorenyl silane titanium dimethyl, (isopropylamide)dimethyl-9-fluorenyl silane titanium dichloride, (isobutylamide)dimethyl-9-(3,6-dimethylfluorenyl)silane titanium dichloride, (t-butylamide)dimethyl-9-fluorenyl silane titanium dichloride, (isopropylamide)dimethyl-9-(3,6-dimethylfluorenyl)silane titanium dichloride, (isobutylamide)dimethyl-9-(3,6-dimethylfluorenyl)silane titanium dichloride, (t-butylamide)dimethyl-9-(3,6-dimethylfluorenyl)silane titanium dimethyl, (isopropylamide)dimethyl-9-[3,6-di(i-propyl)fluorenyl]silane titanium dichloride, (isobutylamide)dimethyl-9-[3,6-di(i-propyl)fluorenyl]silane titanium dichloride, (t-butylamide)dimethyl-9-[3,6-di(i-propyl)fluorenyl]silane titanium dimethyl, (isopropylamide)dimethyl-9-[3,6-di(t-butyl)fluorenyl]silane titanium dichloride, (isobutylamide)dimethyl-9-[3,6-di(t-butyl)fluorenyl]silane titanium dichloride, (t-butylamide)dimethyl-9-[3,6-di(t-butyl)fluorenyl]silane titanium dimethyl, (isopropylamide)dimethyl-9-[2,7-di(t-butyl)fluorenyl]silane titanium dichloride, (isobutylamide)dimethyl-9-[2,7-di(t-butyl)fluorenyl]silane titanium dichloride, (t-butylamide)dimethyl-9-[2,7-di(t-butyl)fluorenyl]silane titanium dimethyl, (isopropylamide)dimethyl-9-(2,3,6,7-tetramethylfluorenyl)silane titanium dichloride, (isobutylamide)dimethyl-9-(2,3,6,7-tetramethylfluorenyl)silane titanium dichloride, (t-butylamide)dimethyl-9-(2,3,6,7-tetramethylfluorenyl)silane titanium dimethyl and the like. Preferred is (t-butylamide) dimethyl-9-fluorenyl silane titanium dimethyl ((t-BuNSiMe$_2$Flu)TiMe$_2$). (t-BuNSiMe$_2$Flu)TiMe$_2$ is a titanium complex represented by the following formula (2), and can easily be synthesized according to, for example, "*Macromolecules*, vol. 31, pp. 3184, 1998".

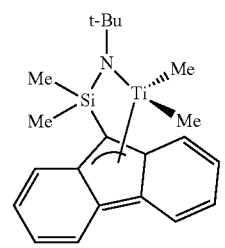

(Wherein Me represents a methyl group, and t-Bu represents a tert-butyl group.)

(Non-Bridged Ketimide-Modified Half-Titanocene Catalyst)

There is no particular limitation for the non-bridged ketimide-modified half-titanocene catalyst, and those known to public can be used. The above half-titanocene catalysts may be used alone or in combination of two or more.

Examples of the non-bridged ketimide-modified half-titanocene catalyst include, for example, those represented by the following formula (3).

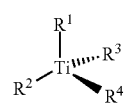

(Wherein $R^1$ is a substituent represented by the following formula (4), and $R^2$ is a ketimide group represented by the following formula (5) or (6), or a phenoxy group represented by the following formula (7), and $R^3$ and $R^4$ are independently a halogen atom or an alkyl group.)

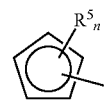

(Wherein $R^5$ is an alkyl group, and n is an integer from 0 to 5.)

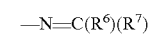

(Wherein $R^6$ and $R^7$ are independently an alkyl group or a phenyl group.)

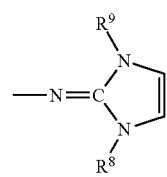

(Wherein $R^8$ and $R^9$ are independently an alkyl group or a phenyl group.)

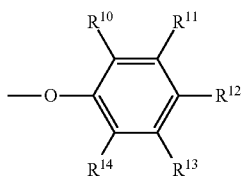

(Wherein $R^{10}$, $R^{11}$, $R^{12}$, $R^{13}$, and $R^{14}$ are independently a hydrogen atom, an alkyl group, or a phenyl group.)

Examples of $R^3$ and $R^4$ include halogen atoms such as a fluorine atom, a chlorine atom, and a bromine atom; and alkyl groups having 1 to 4 carbon atoms such as a methyl group, an ethyl group, and a propyl group. A chlorine atom is preferred.

Specific examples of $R^5$ include alkyl groups having 1 to 5 carbon atoms such as a methyl group, an ethyl group, a propyl group, an isopropyl group, a butyl group, an isobutyl group, a tert-butyl group, a pentyl group, and a neopentyl group. A tert-butyl group is preferred.

Specific examples of $R^6$ and $R^7$ include alkyl groups having 1 to 5 carbon atoms such as a methyl group, an ethyl group, a propyl group, an isopropyl group, a butyl group, an isobutyl group, a tert-butyl group, a pentyl group, and a neopentyl group. A tert-butyl group is preferred.

Specific examples of $R^8$ and $R^9$ include alkyl groups having 1 to 5 carbon atoms such as a methyl group, an ethyl group, a propyl group, an isopropyl group, a butyl group, an isobutyl group, a tert-butyl group, a pentyl group, and a neopentyl group; and a phenyl group. A tert-butyl group, a phenyl group and others are preferred.

Specific examples of $R^{10}$, $R^{11}$, $R^{12}$, $R^{13}$, and $R^{14}$ include a hydrogen atom; alkyl groups having 1 to 4 carbon atoms such as a methyl group, an ethyl group, a propyl group, an isopropyl group, a butyl group, an isobutyl group, and a tert-butyl group; a phenyl group and others. $R^{10}$ and $R^{14}$ are preferably isopropyl groups, and $R^{12}$ and $R^{13}$ are preferably hydrogen atoms.

Specific examples of the non-bridged ketimide-modified half-titanocene catalyst include $CpTiCl_2(N=C(t-Bu)_2)$, $(t-BuC_5H_4)TiCl_2(N=C(t-Bu)_2)$, and a compound represented by the following formula (8) or (9) wherein Cp represents a cyclopentadienyl group, and t-Bu represents a tert-butyl group. $CpTiCl_2$ $(N=C$ $(t-Bu)_2)$ and $(t-BuC_5H_4)$ $TiCl_2$ $(N=C$ $(t-Bu)_2)$ are preferred.

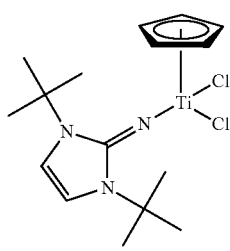

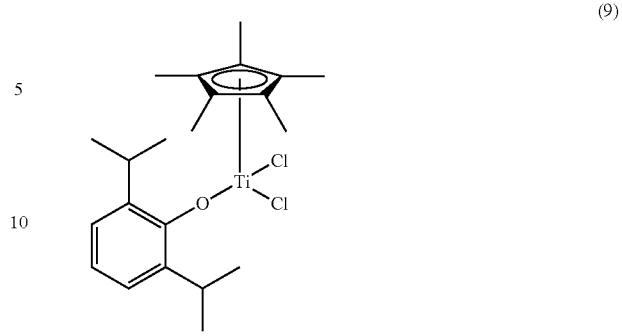

[Co-Catalyst Including Alkylaluminoxane]

The copolymer according to the present invention can be obtained more easily when a co-catalyst including alkylaluminoxane is used along with the above catalyst. The above co-catalysts may be used alone or in combination of two or more.

There is no particular limitation for alkylaluminoxane. Examples of alkylaluminoxane include, for example, compounds represented by the following formula (10) or (11). Alkylaluminoxanes represented by the following formula (10) or (11) are products which can be obtained by reacting trialkylaluminium with water.

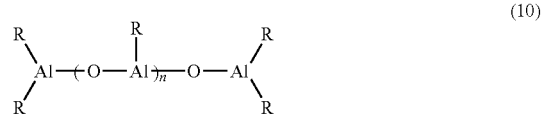

(Wherein R represents an alkyl group having 1 to 4 carbon atoms, and n represents an integer of 0 to 40, more preferably an integer of 2 to 30.)

Examples of alkylaluminoxane include methylaluminoxane; and a modified methylaluminoxane in which a portion of the methyl group of methylaluminoxane is substituted with another alkyl group. For the modified methylaluminoxane, preferred are, for example, those having an alkyl group having 2 to 4 carbon atoms such as an ethyl group, a propyl group, an isopropyl group, a butyl group, and an isobutyl group as an alkyl group after substitution. In particular, a modified methylaluminoxane in which a portion of the methyl group is substituted with an isobutyl group is more preferred. Specific examples of alkylaluminoxane include methylaluminoxane, ethylaluminoxane, propylaluminoxane, butylaluminoxane, isobutylaluminoxane, methylethylaluminoxane, methylbutylaluminoxane, methylisobutylaluminoxane and the like. Among these, methylaluminoxane and methylisobutylaluminoxane are preferred.

Alkylaluminoxane can be prepared by a known method. Commercially available alkylaluminoxane may also be used. Examples of commercially available alkylaluminoxane include, for example, MMAO-3A, TMAO-200 series, TMAO-340 series, all of which are available from Tosoh Finechem Corporation; a methylaluminoxane solution available from Albemarle; and the like.

[Chain Transfer Agent]

Chain transfer agents which may be used in the present invention are compounds capable of chain transfer. Chain transfer agents may be used alone or in combination of two or more.

There is no particular limitation for the chain transfer agents, and any known compounds capable of chain transfer can be used, including, for example, alkylaluminum. Examples of alkylaluminum include, for example, compounds represented by the following general formula (12).

$$(R^{10})_z AlX_{3-z} \quad (12)$$

(Wherein $R^{10}$ is an alkyl group having 1 to 15 carbon atoms, preferably having 1 to 8 carbon atoms, and X is a halogen atom or a hydrogen atom, and z is an integer of 1 to 3.)

Examples of an alkyl group having 1 to 15 carbon atoms include, for example, a methyl group, an ethyl group, n-propyl group, an isopropyl group, an isobutyl group, n-octyl group and the like.

Specific examples of alkylaluminum include trialkylaluminium such as trimethylaluminum, triethylaluminum, triisopropylaluminum, tri-n-butylaluminum, triisobutylaluminum, and tri-sec-butylaluminum; dialkylaluminum halide such as dimethylaluminum chloride and diisobutylaluminum chloride; dialkylaluminum hydride such as diisobutylaluminum hydride; dialkylaluminum alkoxide such as dimethylaluminum methoxide; and the like.

[Cyclic Olefin Monomer (A)]

Examples of the cyclic olefin monomer (A) derived from norbornene include, for example, norbornene and substituted norbornene. Norbornene is preferred. The above cyclic olefin monomers (A) may be used alone or in combination of two or more.

There is no particular limitation for the above substituted norbornene. Examples of a substituent in the above substituted norbornene include, for example, a halogen atom and a monovalent or divalent hydrocarbon group. Specific examples of the substituted norbornene include those represented by the following general formula (I).

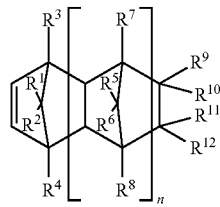

(I)

(Wherein $R^1$ to $R^{12}$ each may be same or different, and are selected from the group consisting of a hydrogen atom, a halogen atom, and a hydrocarbon group;

$R^9$ and $R^{10}$, $R^{11}$ and $R^{12}$ may join together to form a divalent hydrocarbon group;

$R^9$ or $R^{10}$, and $R^{11}$ or $R^{12}$ may join together to form a ring;

n represents 0 or a positive integer;

$R^5$ to $R^8$ each may be same or different in the corresponding repeating units when n is two or more; and at least one of $R^1$ to $R^4$ and $R^9$ to $R^{12}$ is not a hydrogen atom when n=0.)

Substituted norbornene represented by the general formula (I) will be described. $R^1$ to $R^{12}$ in the general formula (I) each may be same or different, and are selected from the group consisting of a hydrogen atom, a halogen atom, and a hydrocarbon group, Specific examples of $R^1$ to $R^8$ include, for example, a hydrogen atom; halogen atoms such as fluorine, chlorine, and bromine; an alkyl group having 1 to 20 carbon atoms. They may each be different or partially different, or they all may be same.

Specific examples of $R^9$ to $R^{12}$ can include, for example, a hydrogen atom; halogen atoms such as fluorine, chlorine, and bromine; an alkyl group having 1 to 20 carbon atoms; cycloalkyl groups such as a cyclohexyl group; substituted or unsubstituted aromatic hydrocarbon groups such as a phenyl group, a tolyl group, an ethylphenyl group, an isopropylphenyl group, a naphthyl group, and an anthryl group; an aralkyl group in which the aryl group is substituted with a benzyl group, a phenethyl group, and other alkyl groups. They may each be different or partially different, or they all may be same.

Specific examples of $R^9$ and $R^{10}$, or $R^{11}$ and $R^{12}$ which join together to form a divalent hydrocarbon group can include, for example, alkylidene groups such as an ethylidene group, a propylidene group, and an isopropylidene group; and the like.

In a case where $R^9$ or $R^{10}$, and $R^{11}$ or $R^{12}$ join together to form a ring, the resulting ring may be monocyclic or polycyclic, or may be a crosslinked polycyclic ring, a ring having a double bond, or a ring including a combination thereof. Further, these rings may have substituents such as methyl groups.

Specific examples of the substituted norbornene represented by the general formula (I) can include bicyclic olefin such as 5-methyl-bicyclo[2.2.1]hept-2-ene, 5,5-dimethyl-bicyclo[2.2.1]hept-2-ene, 5-ethyl-bicyclo[2.2.1]hept-2-ene, 5-butyl-bicyclo[2.2.1]hept-2-ene, 5-ethylidene-bicyclo[2.2.1]hept-2-ene, 5-hexyl-bicyclo[2.2.1]hept-2-ene, 5-octyl-bicyclo[2.2.1]hept-2-ene, 5-octadecyl-bicyclo[2.2.1]hept-2-ene, 5-methylidene-bicyclo[2.2.1]hept-2-ene, 5-vinyl-bicyclo[2.2.1]hept-2-ene, and 5-propenyl-bicyclo[2.2.1]hept-2-ene;

tricyclic olefin such as tricyclo[4.3.0.1$^{2,5}$]deca-3,7-diene (trivial name: dicyclopentadiene), tricyclo[4.3.0.1$^{2,5}$]deca-3-ene; tricyclo[4.4.0.1$^{2,5}$]undeca-3,7-diene, or tricyclo[4.4.0.1$^{2,5}$]undeca-3,8-diene, or tricyclo[4.4.0.1$^{2,5}$]undeca-3-ene as a partial hydrogenated product thereof (or an adduct of cyclopentadiene and cyclohexene); 5-cyclopentyl-bicyclo[2.2.1]hept-2-ene, 5-cyclohexyl-bicyclo[2.2.1]hept-2-ene, 5-cyclohexenylbicyclo[2.2.1]hept-2-ene, and 5-phenyl-bicyclo[2.2.1]hept-2-ene;

tetracyclic olefin such as tetracyclo[4.4.0.1$^{2,5}$.1$^{7,10}$]dodeca-3-ene (also simply referred to as tetracyclododecene), 8-methyltetracyclo[4.4.0.1$^{2,5}$.1$^{7,10}$]dodeca-3-ene, 8-ethyltetracyclo[4.4.0.1$^{2,5}$.1$^{7,10}$]dodeca-3-ene, 8-methylidenetetracyclo[4.4.0.1$^{2,5}$.1$^{7,10}$]dodeca-3-ene, 8-ethylidenetetracyclo[4.4.0.1$^{2,5}$.1$^{7,10}$]dodeca-3-ene, 8-vinyltetracyclo[4,4.0.1$^{2,5}$.1$^{7,10}$]dodeca-3-ene, and 8-propenyl-tetracyclo[4.4.0.1$^{2,5}$.1$^{7,10}$]dodeca-3-ene;

polycyclic olefin such as 8-cyclopentyl-tetracyclo[4.4.0.1$^{2,5}$.1$^{7,10}$]dodeca-3-ene, 8-cyclohexyl-tetracyclo[4.4.0.1$^{2,5}$.1$^{7,10}$]dodeca-3-ene, 8-cyclohexenyl-tetracyclo[4.4.0.1$^{2,5}$.1$^{7,10}$]dodeca-3-ene, 8-phenyl-cyclopentyl-tetracyclo[4.4.0.1$^{2,5}$.1$^{7,10}$]dodeca-3-ene, tetracyclo[7.4.1$^{3,6}$.0$^{1,9}$.0$^{2,7}$]tetradeca-4,9,11,13-tetraene (also referred to as 1,4-methano-1,4,4a,9a-tetrahydrofluorene), tetracyclo[8.4.1$^{4,7}$.0$^{1,10}$.0$^{3,8}$]pentadeca-5,10,12,14-tetraene (also referred to as 1,4-methano-1,4,4a,5,10,10a-hexahydroanthracene); pentacyclo[6.6.1.1$^{3,6}$.0$^{2,7}$.0$^{9,14}$]-4-hexadecene, pentacyclo[6.5.1.1$^{3,6}$.0$^{2,7}$.0$^{9,13}$]-4-pentadecene, pentacyclo[7.4.0.0$^{2,7}$.1$^{3,6}$.1$^{10,13}$]-4-pentadecene; heptacyclo

[8.7.0.1$^{2,9}$.1$^{4,7}$.1$^{11,17}$.0$^{3,8}$.0$^{12,16}$]-5-eicosene, heptacyclo [8.7.0.1$^{2,9}$.0$^{3,8}$.1$^{4,7}$.0$^{12,17}$.1$^{13,16}$]-14-eicosene; and a tetramer of cyclopentadiene.

Among these, preferred are alkyl-substituted norbornene (for example, bicyclo[2.2.1]hept-2-ene substituted with one or more alkyl groups), and alkylidene-substituted norbornene (for example, bicyclo[2.2.1]hept-2-ene substituted with one or more alkylidene groups). Particularly preferred is 5-ethylidene-bicyclo[2.2.1]hept-2-ene (trivial name: 5-ethylidene-2-norbornene or simply ethylidene norbornene).

[α-Olefin Monomer (B)]

Examples of the monomer (B) derived from at least one of C4 to C12 α-olefins include, for example, C4 to C12 α-olefins and C4 to C12 α-olefins each having at least one substituent such as a halogen atom. C4 to C12 α-olefins are preferred.

There is no particular limitation for the C4 to C12 α-olefins, but they include, for example, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, and 1-dodecene. Among these, 1-hexene, 1-octene, and 1-decene are preferred.

[Conditions of Polymerization Process]

There is no particular limitation for the conditions of a polymerization process for obtaining a copolymer from monomers as described above, and any known condition can be used as long as a desired copolymer can be obtained. The polymerization temperature, polymerization pressure, polymerization time and the like are to be adjusted in an appropriate manner. The usage amount of each component is recited below as an example.

The addition amount of the α-olefin monomer (B) is preferably 1 part by mass or more and 500 parts by mass or less per 100 parts by mass of the cyclic olefin monomer (A), more preferably 10 parts by mass or more and 300 parts by mass or less. The usage amount of a titanocene catalyst is preferably 0.00001 parts by mass or more and 0.05 parts by mass or less relative to 100 parts by mass of the cyclic olefin monomer (A), more preferably 0.0001 parts by mass or more and 0.03 parts by mass or less.

The usage amount of a non-bridged ketimide-modified half-titanocene catalyst is preferably 0.00001 parts by mass or more and 0.05 parts by mass or less relative to 100 parts by mass of the cyclic olefin monomer (A), more preferably 0.0001 parts by mass or more and 0.03 parts by mass or less.

The usage amount of alkylaluminoxane is preferably 0.0001 parts by mass or more and 5 parts by mass or less in terms of Al relative to 100 parts by mass of the cyclic olefin monomer (A), more preferably 0.01 parts by mass or more and 3 parts by mass or less.

The usage amount of a chain transfer agent is preferably 0.1 parts by mass or more and 10 parts by mass or less relative to 100 parts by mass of the cyclic olefin monomer (A), more preferably 0.3 parts by mass or more and 5 parts by mass or less.

[Formed Article]

The formed article according to the present invention can be obtained by forming the above copolymer by a known forming method. There is no particular limitation for the formed article. Examples of the formed article include a film, a sheet, a plate and the like. The formed article according to the present invention is preferably a transparent film in view of that the effect of the present invention may easily be obtained.

(Transparent Film)

The transparent film according to the present invention can be film-formed using the above copolymer by the publicly known solution casting method, spin coating method, heat press method, T-die method, or calender method. However, the solution casting method, the spin coating method, and the like are preferably used when a copolymer with high Tg is used. This is because melt forming becomes difficult as the Tg of the copolymer increases. Further, a publicly known antioxidizing agent and the like may be added when forming process is performed at high temperature in order to prevent oxidation of a copolymer.

There is no particular limitation for the conditions for forming the transparent film according to the present invention, but the following conditions can be mentioned as examples.

Examples of film-forming by the solution casting method can include, for example, a process including: dissolving a copolymer in a suitable solvent to prepare a solution with an appropriate concentration; and poring or applying the solution onto a suitable substrate and performing drying; and then detaching the resulting transparent film from the substrate. Solvents used for preparing the solution can include, for example, aromatic hydrocarbon-based solvents such as benzene, toluene, and xylene; aliphatic hydrocarbon-based solvents such as cyclohexane, hexane, and methylcyclohexane; halogenated hydrocarbon-based solutions such as dichloromethane and chloroform; and the like. The concentration of a copolymer in the solution is usually 0.1 to 90 mass %, preferably 1 to 50 mass %, and more preferably 5 to 35 mass %. A copolymer concentration of less than the above ranges may not provide a film having a sufficient thickness while a copolymer concentration of more than the above ranges may not provide a film having a uniform thickness and surface state due to an excessively increased viscosity of the solution. The viscosity of the solution is usually 1 to 1,000,000 mPa·s at room temperature, preferably 10 to 100,000 mPa·s, more preferably 100 to 50,000 mPa·s, and in particular preferably 1,000 to 40,000 mPa·s. Substrates which can be used for the solution casting method can include, for example, metal drums, steel belts, polyester films such as polyethylene terephthalate (PET) and polyethylenenaphthalate (PEN), polytetrafluoroethylene belts, and the like.

The thickness of the transparent film according to the present invention may be adjusted to 5 μm or more and 300 μm or less.

The transparent film according to the present invention has excellent transparency. The transparency of a transparent film can be determined by measuring haze in accordance with the JIS K7136 method. The transparent film according to the present invention can have a haze of 0.1 to 1.0% as measured in accordance with the JIS K7136 method. The transparent film according to the present invention can preferably be used, for example, for optical uses, medical uses, packaging uses, electric/electronic component uses, and manufactural/industrial component uses.

(Transparent Electrically Conductive Layer)

A transparent electrically conductive layer may be formed on a surface of the formed article according to the present invention to prepare a layered product. A layered product including at least the formed article according to the present invention and a transparent electrically conductive layer is hereafter referred to as a "transparent electrically conductive layered product".

The transparent electrically conductive layer is usually layered on the whole or a portion of one surface of the formed article according to the present invention, but it may be layered on the both surfaces of the formed article according to the present invention. The transparent electrically conductive layer may be layered directly on a surface of the formed article according to the present invention, but it may be layered through a different layer. Common transparent electrically conductive layers used in transparent electrodes and the like can be used, but there is no particular limitation for the transparent electrically conductive layer as long as it is transparent and electrically conductive.

The transparent electrically conductive layer may be formed from any electrically conductive polymer, but preferably formed from an electrically conductive inorganic compound in view of that formation can be performed at high temperature, and a transparent electrically conductive layered product with excellent heat resistance tends to be obtained. Electrically conductive inorganic compounds include, for example, metal oxide [for example, indium oxide ($InO_2$, $In_2O_3$, and $In_2O_3$—$SnO_2$ composite oxide (ITO) and the like), tin oxide ($SnO_2$, $SnO_2$—$Sb_2O_5$ composite oxide, fluorine-doped tin oxide (FTC)) and the like), zinc oxide (ZnO, ZnO—$Al_2O_3$ composite oxide and the like)], metal (for example, gold, silver, platinum, and palladium), and the like. These electrically conductive inorganic compounds may be used alone, or in combination of two or more. Among these electrically conductive inorganic compounds, metal oxide is preferred, and indium oxide such as ITO is more preferred in view of that a transparent electrically conductive layered product with excellent transparency and electric conductivity tends to be obtained.

There is no particular limitation for the proportion of tin oxide ($SnO_2$) when $In_2O_3$—$SnO_2$ composite oxide (ITO) is used as an electrically conductive inorganic compound, but it may be 5 mass % or more relative to the whole composite oxide, preferably 5 mass % or more and 20 mass % or less, more preferably 6 mass % or more and 15 mass % or less, and even more preferably 7 mass % or more and 12 mass % or less. According to the present invention, a transparent electrically conductive film with high crystallinity can be obtained using ITO in which the proportion of tin oxide is about 10 mass %.

A transparent electrically conductive layer can be formed by the conventional method, for example, sputtering, vapor deposition, chemical vapor deposition, and the like using an electrically conductive inorganic compound and the like, and sputtering is usually used. Such a transparent electrically conductive layer may be those described in, for example, Japanese Unexamined Patent Application, Publication No. 2009-76544, Japanese Patent No. 4165173, Japanese Unexamined Patent Application, Publication No. 2004-149884, and others. Among the above methods, a transparent electrically conductive layer formed by sputtering is preferred in view of that a uniformly thin film tends to be formed, and treatment may be performed under conditions of a vacuum, and the high electric conductivity of the resulting transparent electrically conductive layer tends to be maintained.

The transparent electrically conductive layered product according to the present invention can show low light scattering, and can provide low haze (preferably 5% or less, more preferably 0.1 to 5%). Haze can be measured in accordance with the JIS K7136 method. More specifically, it can be measured by the method described in Examples below.

EXAMPLES

Below, the present invention will be specifically described, but the present invention shall not be limited to these Examples.

[Production of Copolymer]

Examples 1 to 7 and Comparative Example 2

Each monomer shown in Table 1 and a catalyst and a co-catalyst(s) shown in Table 2 were added to a dry glass reactor. Note that the catalyst and the co-catalyst(s) were individually dissolved in toluene, and then added to the reactor. The content were stirred to maintain polymerization at a polymerization temperature and polymerization time shown in Table 3, and 1 part by mass of 2-propanol were then added to quench the reaction. Subsequently, concentrated hydrochloric acid shown in Table 3 was added to the resulting polymerization reaction liquid at room temperature, and stirred for 30 minutes, and then ion exchanged water was added in an amount of ⅓ of the amount (volume) of the solution, and further stirred for 10 minutes. The mixture of the resulting polymerization reaction liquid and aqueous layer was transferred into a separating funnel, and the aqueous layer was separated and discarded. Subsequently, the same amount of ion exchanged water as above was added into the separating funnel containing the polymerization reaction liquid, and the polymerization reaction liquid was washed, and the aqueous layer was then separated. After the aqueous layer has been neutralized by repeating wash of the polymerization reaction liquid with ion exchanged water several times, the polymerization reaction liquid was poured into a large amount of methanol to completely precipitate a polymer, which was then filtered out and washed. Then drying under reduced pressure was performed at 60° C. for one day or longer to obtain a target copolymer. The resulting copolymer was weighed ("yield" in Table 3). The proportion of the resulting copolymer relative to the amount of a catalyst used was computed ("g (copolymer)/g (catalyst)" in Table 3).

Comparative Example 1

Each monomer shown in Table 1 and the catalyst and co-catalyst(s) shown in Table 2 were added to a dry glass reactor. Note that the catalyst and co-catalyst(s) were individually dissolved in toluene, and then added to the reactor. The content were stirred to maintain polymerization at a polymerization temperature and polymerization time shown in Table 3, and 1 part by mass of 2-propanol were then added to quench the reaction. Subsequently, the resulting polymerization reaction liquid was poured into a large amount of hydrochloric acid-acidified methanol to completely precipitate a polymer, which was then filtered out and washed. Then drying under reduced pressure was performed at 60° C. for one day or longer to obtain a target copolymer. The resulting copolymer was weighed ("yield" in Table 3). The proportion of the resulting copolymer relative to the amount of a catalyst used was computed ("g (copolymer)/g (catalyst)" in Table 3).

Comparative Example 3

A 2-norbornene-ethylene copolymer (TOPAS Advanced Polymers, GmbH "TOPAS® 6017S-04") was used.

The following catalysts and co-catalysts were used.
Catalyst A: [(t-BuNSiMe$_2$Flu)TiMe$_2$]
Catalyst B: CpTiCl$_2$(N=C(t-Bu)$_2$)
Catalyst C: (t-BuC$_5$H$_4$)TiCl$_2$(N=C(t-Bu)$_2$)
Co-catalyst A: 6.5 mass % (as the content of Al atoms) MMAO-3A toluene solution (a solution of methylisobutylaluminoxane represented by [(CH$_3$)$_{0.7}$(iso-C$_4$H$_9$)$_{0.3}$AlO]$_n$ from Tosoh Finechem Corporation, which contains 6 mol % trimethylaluminum relative to the total amount of Al.
Co-catalyst B: 9.0 mass % (as the content of Al atoms) TMAO-211 toluene solution (a solution of methylaluminoxane from Tosoh Finechem Corporation, which contains 26 mol % trimethylaluminum relative to the total amount of Al)
Co-catalyst C: triisobutylaluminum
Co-catalyst D: dimethylanilinium tetrakis(pentafluorophenyl)borate The number average molecular weight, Tg, the presence or absence of decalcification, and the Al content of each copolymer were shown in Table 4.

Values for "parts" in Tables 1 and 2 are relative to 100 parts of 2-norbornene. Values for "parts" of Co-catalyst A and Co-catalyst B in Table 2 are those as toluene solutions.

[Production of Transparent Film]

Each copolymer in 20 parts by mass and toluene in 80 parts by mass were introduced into a closed container, and gently stirred over 24 hours to dissolve each copolymer. The resulting solution was filtered under pressure with a 10 μm mesh, and then allowed to stand for additional 24 hours to remove bubbles in the solution. Subsequently, each solution (at a solution temperature of 20° C.) was flow-cast on a surface of a PET substrate (Product Name "T-60," Toray Industries, Inc.) using a bar coater. After flow-casting, the PET substrate was sealed, and allowed to stand for one minute for making the surface even (for leveling the surface). After leveling, the PET substrate was dried for five minutes at 60° C. in a hot air dryer, and then a film was detached from the PET substrate. Subsequently, the above film was fixed to a stainless-steel frame, and dried for 30 minutes at 210° C. under reduced pressure in a reduced-pressure dryer to obtain a transparent film (a thickness of 100 μm). The resulting transparent film was subjected to the following tests.

[Total Light Transmittance]

Each transparent film was measured for total light transmittance in accordance with the JIS K7361-1 method. Specifically, each transparent film was measured for total light transmittance with a haze meter NDH-5000W (Nippon Denshoku Industries Co., Ltd.) using a D65 fluorescent lamp as a light source. Results are shown in Table 4.

[Haze]

Each transparent film was measured for haze in accordance with the JIS K7136 method. Specifically, each transparent film was measured for haze with a haze meter NDH-5000W (Nippon Denshoku Industries Co., Ltd.) using a D65 fluorescent lamp as a light source. Results are shown in Table 4.

[Tensile Test]

Each transparent film was punched into a Type-2 dumbbell shape, and tensile tests were performed in accordance with JIS K7161 under test environments of a temperature of 25° C. and a humidity of 50% RH. A tensile and compression testing machine (Product Name "TENSILON UCT-5T", Orientec Corporation) was used under a condition of a tensile rate of 20 mm/min. A stress-strain curve was obtained based on the results. From the stress-strain curve obtained, the elastic modulus, the elongation at maximum load, and the tensile strength of each transparent film were determined. Results are shown in Table 4.

[Flex Resistance Test]

Each transparent film was cut into a test piece with a dimension of 1×10 cm, and its flex resistance was determined in accordance with the following method. That is, the test piece was wound around multiple mandrels with different diameters in accordance with the cylindrical mandrel method (JISK5600-5-1), and visually evaluated for whether a crack occurred at a wound portion. When a crack did not occur at mandrels with diameters of 2 mm or less, it was considered as Good. When a crack occurred at mandrels with diameters of 2 mm or less, it was considered as Bad.

TABLE 1

| | Composition ratio of each monomer for changing (Parts) | | | |
| --- | --- | --- | --- | --- |
| | 2-norbornene | 1-octene | 1-hexene | 1-decene |
| Example 1 | 100 | 179 | — | — |
| Example 2 | 100 | 179 | — | — |
| Example 3 | 100 | 98 | — | — |
| Example 4 | 100 | 152 | — | — |
| Example 5 | 100 | — | 73 | — |
| Example 6 | 100 | — | — | 122 |
| Example 7 | 100 | 26 | — | — |
| Comparative Example 1 | 100 | 98 | — | — |
| Comparative Example 2 | 100 | 98 | — | — |
| Comparative Example 3 | — | — | — | — |

TABLE 2

| | Type of catalyst | Catalyst (Parts) | Type of co-catalyst | Co-catalyst A (Parts) | Co-catalyst B (Parts) | Co-catalyst C (Parts) | Co-catalyst D (Parts) |
| --- | --- | --- | --- | --- | --- | --- | --- |
| Example 1 | A | 0.0090 | A + B | 17.04 | 1.33 | — | — |
| Example 2 | A | 0.0090 | A + B | 14.20 | 3.33 | — | — |
| Example 3 | A | 0.0058 | A + B | 8.38 | 5.91 | — | — |
| Example 4 | A | 0.0064 | A + B | 6.76 | 4.74 | — | — |
| Example 5 | A | 0.0060 | A + B | 6.24 | 4.38 | — | — |
| Example 6 | A | 0.0060 | A + B | 6.24 | 4.38 | — | — |
| Example 7 | C | 0.0014 | A | 1.47 | — | — | — |
| Comparative Example 1 | A | 0.0049 | C + D | — | — | 0.001 | 0.01 |
| Comparative Example 2 | A | 0.3757 | A | 157.49 | — | — | — |

TABLE 2-continued

|  | Type of catalyst | Catalyst (Parts) | Type of co-catalyst | Co-catalyst A (Parts) | Co-catalyst B (Parts) | Co-catalyst C (Parts) | Co-catalyst D (Parts) |
| --- | --- | --- | --- | --- | --- | --- | --- |
| Comparative Example 3 | — | — | — | — | — | — | — |

TABLE 3

|  | Polymerization temperature (° C.) | Polymerization time (hr) | Amount of hydrochloric acid (Parts by mass) | Yield (Parts by mass) | g (copolymer)/ g (catalyst) |
| --- | --- | --- | --- | --- | --- |
| Example 1 | 40 | 1 | 45 | 19.9 | 2,200 |
| Example 2 | 40 | 1 | 45 | 19.0 | 2,100 |
| Example 3 | 40 | 4 | 30 | 28.0 | 4,800 |
| Example 4 | 40 | 4 | 30 | 23.8 | 3,700 |
| Example 5 | 40 | 4 | 30 | 17.9 | 3,000 |
| Example 6 | 40 | 4 | 30 | 14.9 | 2,500 |
| Example 7 | 0 | 2 | 30 | 6.6 | 4,600 |
| Comparative Example 1 | 40 | 1 | — | 21.7 | 4,400 |
| Comparative Example 2 | 40 | 2 | 150 | 37.6 | 100 |
| Comparative Example 3 | — | — | — | — | — |

TABLE 4

|  | Number average molecular weight | Tg (° C.) | Al content (ppm) | Total light transmittance (%) | Haze (%) | Elastic modulus (MPa) | Elongation at maximum load (%) | Tensile strength (MPa) | Flex resistance test (mm) |
| --- | --- | --- | --- | --- | --- | --- | --- | --- | --- |
| Example 1 | 121,000 | 227 | 1.0 | 91.5 | 0.3 | 2,350 | 3.2 | 55 | ○ |
| Example 2 | 73,600 | 219 | 0.6 | 91.6 | 0.3 | 2,320 | 2.6 | 48 | ○ |
| Example 3 | 73,200 | 268 | 2.3 | 91.5 | 0.2 | 2,490 | 3.1 | 56 | ○ |
| Example 4 | 60,000 | 226 | 1.7 | 91.6 | 0.4 | 2,200 | 2.3 | 23 | ○ |
| Example 5 | 42,000 | 300 | 2.6 | 91.7 | 0.5 | 2,630 | 2.4 | 42 | ○ |
| Example 6 | 37,000 | 244 | 1.2 | 91.5 | 0.3 | 2,230 | 2.2 | 33 | ○ |
| Example 7 | 130,000 | 221 | 0.3 | 91.5 | 0.3 | 2,300 | 2.0 | 25 | ○ |
| Comparative Example 1 | 223,000 | 238 | 167 | 91.5 | 3.8 | — | — | — | — |
| Comparative Example 2 | 73,000 | 288 | 211 | 91.5 | 4.2 | — | — | — | — |
| Comparative Example 3 | — | 178 | — | 91.6 | 0.3 | 2,755 | 1.6 | 29 | x |

As shown in Table 4, the proportion of the resulting copolymer is high relative to the amount of a catalyst used according to the present invention. Moreover, a low-haze and highly-transparent film can be obtained.

What is claimed is:

1. A formed article comprising a copolymer, the copolymer comprising;
    a structural unit of a cyclic olefin monomer (A) derived from norbornene, and
    a structural unit of a monomer (B) derived from at least one of C4 to C12 α-olefins,
    wherein the copolymer has a Tg of 200° C. or more and an Al content of 50 ppm or less.

2. The formed article according to claim 1, wherein the formed article is a transparent film having a value of haze of 0.1 to 1.0% as measured in accordance with JIS K7136 method.

3. The formed article according to claim 1, wherein the number average molecular weight of the copolymer is 20,000 or more and 200,000 or less.

4. The formed article according to claim 1, wherein a value of haze as measured in accordance with JIS K7136 method is 0.1 to 1.0%.

5. A transparent electrically conductive layered product, comprising the formed article according to claim 1 and a transparent electrically conductive layer, wherein a value of haze of the transparent electrically conductive layer as measured in accordance with JIS K7136 method is 5% or less.

* * * * *

UNITED STATES PATENT AND TRADEMARK OFFICE
CERTIFICATE OF CORRECTION

PATENT NO. : 10,072,108 B2
APPLICATION NO. : 15/312983
DATED : September 11, 2018
INVENTOR(S) : Takayuki Yaegashi et al.

It is certified that error appears in the above-identified patent and that said Letters Patent is hereby corrected as shown below:

In the Specification

Column 9, Line 42 (approx.), change "(1)" to --(I)--.

Column 12, Line 5 (approx.), change "calender" to --calendar--.

Signed and Sealed this
Thirtieth Day of July, 2019

Andrei Iancu
*Director of the United States Patent and Trademark Office*